Patented Mar. 21, 1933

1,902,287

UNITED STATES PATENT OFFICE

JOSEPH B. McCAULEY, OF CHARLES TOWN, WEST VIRGINIA

ANTIFREEZE COMPOSITION FOR RADIATORS AND THE LIKE

No Drawing.  Application filed September 3, 1931. Serial No. 561,093.

This invention relates to an anti-freeze composition for the production of an anti-freeze cooling solution for automobile radiators and the like, the main object of the invention being to provide a compound which may be shipped in a condensed state and prepared for use by simply adding water thereto to furnish an anti-freezing solution of the required strength.

A further object of the invention is to provide a composition for producing a solution of the character set forth which may be used indefinitely without corroding or otherwise injuring the metal or rubber parts of the radiator and coacting elements of the cooling system of an automobile.

In carrying my invention into practice, I provide a stock composition or base composition from which an anti-freezing solution may be produced by the simple addition of water thereto. This composition comprises sugar, salt, copperas, hydrochloric acid, a heavy oil, such as heavy automobile lubricating oil, and water. The composition is prepared by mixing the ingredients named, water being used in suitable proportion, and boiling such composition to evaporate the water to produce an emulsion-like base or stock composition of a thick, jelly-like consistency, and which may be packed in such condition in suitable containers for storage and dispensation.

To produce a stock or base composition of a suitable character and strength for the manufacture of a gallon of the solution of required strength and resistance to freezing in temperatures as low as 30° F. below zero, the ingredients named are combined substantially in the following proportions, to wit:

Sugar_____ 12 ozs.,
Salt_____ 24 ozs.,
Copperas_____ ¼ oz.,
Hydrochloric acid_____ ½ oz., and
Heavy oil_____ 4 ozs., to which, at the time of use, there may be added boiling water, 7 pints, in which the aforesaid ingredients are stirred to produce one gallon of the solution. A solution so prepared, as stated, will stand a temperature as low as 30° F. below zero without freezing, and by increasing the amount of water used the solution may be weakened to any desired degree to stand higher minimum temperatures as required according to the severity of climatic conditions in various parts of the United States or the world.

The advantages of this composition are, that it may be prepared in condensed form in the shape of a base composition which may be stored and shipped in a small container, thus saving space and expense involved in shipping large containers where the composition must be shipped in liquid form; it may be prepared for use by simply adding hot water thereto, to produce a solution which will be proof against freezing at any desired temperature at or above 30° F. below zero, so that during mild winters or in temperate zones a small amount of the base or stock solution will last a long time; and the solution may be used indefinitely without causing corrosion or other injury to the metal and rubber parts of a cooling system. The ingredients are also comparatively inexpensive so that a composition which may be sold at low cost may be furnished.

In this composition the heavy oil and copperas prevent rust, the salt acts as an anti-freezing agent, the sugar serves to keep the salt in solution and prevent it from graining and its precipitation and its encrustation of surfaces, the copperas also has a preservative action in keeping the metal surfaces clean and preventing deposit of any of the solid ingredients of the composition thereon, while the hydrochloric acid acts as an emulsifying agent to prevent separation and settling of any of the ingredients, and the water acts as a solution-forming agent and strength regulator.

In preparing the condensed composition it has been my practice to boil the primary solution for a period of about five hours over gas heat, but any other suitable and equivalent way of producing the basic composition may be employed. Also the portions of the ingredients may be modified to certain degrees without materially affecting the action of the composition as a whole.

What I claim is:

1. An anti-freeze composition for automobile radiators and the like comprising a mixture of sugar, 12 ozs., salt, 24 ozs., copperas, ¼ oz., hydrochloric acid, ½ oz., and heavy oil, 4 ozs.

2. An anti-freeze composition for automobile radiators and the like comprising a mixture of sugar, 12 ozs., salt, 24 ozs., copperas, ¼ oz., hydrochloric acid, ½ oz., heavy oil, 4 ozs., and water about 7 pints.

3. The method of preparing an anti-freeze stock composition for use in preparing an anti-freeze solution for automobile radiators, which consists in mixing sugar, 12 ozs., salt, 24 ozs., copperas, ¼ oz., hydrochloric acid, ½ oz., heavy oil, 4 ozs., and water, and boiling the mixture to evaporate the water and to produce an emulsified stock composition of a thick, jelly-like consistency to which boiling water in suitable quantity may be added to furnish an anti-freeze solution of required strength.

4. An anti-freeze stock composition for automobile radiators and the like comprising an emulsified mixture prepared from a composition of sugar, 12 ozs., salt, 24 ozs., copperas, ¼ oz., hydrochloric acid, ½ oz., heavy oil, 4 ozs., and water, about 7 pints, from which the water has been evaporated to produce a mass of jelly-like consistency suitable by the addition of boiling water to furnish a solution of required strength.

In testimony whereof I affix my signature.

JOSEPH B. McCAULEY.